(12) United States Patent
Fernandez et al.

(10) Patent No.: US 7,921,768 B2
(45) Date of Patent: Apr. 12, 2011

(54) VERTICAL AND HORIZONTAL OVEN

(75) Inventors: Juan Fernandez, Towaco, NJ (US);
Paul McGrath, Towaco, NJ (US);
Raymond Hoi Tak Lam, Wanchai (CN)

(73) Assignee: Products of Tomorrow, Inc., Montville, NJ (US)

( * ) Notice: Subject to any disclaimer, the term of this patent is extended or adjusted under 35 U.S.C. 154(b) by 718 days.

(21) Appl. No.: 11/483,335

(22) Filed: Jul. 7, 2006

(65) Prior Publication Data

US 2006/0225580 A1    Oct. 12, 2006

Related U.S. Application Data

(60) Provisional application No. 60/791,737, filed on Apr. 13, 2006.

(51) Int. Cl.
*A47J 37/04* (2006.01)
*A47J 37/06* (2006.01)
(52) U.S. Cl. ................. 99/419; 99/421 A; 99/421 H
(58) Field of Classification Search ............. 99/324, 99/339, 400, 419, 421 R–421 V, 446, 451, 99/467, 485; 219/391–414; 236/94; 126/41 A, 126/41 B
See application file for complete search history.

(56) References Cited

U.S. PATENT DOCUMENTS

| | | | |
|---|---|---|---|
| 2,729,160 A | 1/1956 | Pirz | |
| 2,831,954 A * | 4/1958 | Pirz | ................. 219/394 |
| 3,263,593 A | 8/1966 | Appleman | |
| 3,263,594 A | 8/1966 | Appleman | |
| 3,848,522 A | 11/1974 | Trelc | |
| 3,972,276 A | 8/1976 | Kamra | |
| 4,089,258 A | 5/1978 | Berger | |
| 4,491,065 A | 1/1985 | Poulson | |
| 4,562,771 A | 1/1986 | Williams | |
| 4,571,474 A * | 2/1986 | Pomroy | .................. 219/753 |
| 4,598,690 A * | 7/1986 | Hsu | ..................... 126/25 R |
| 4,598,693 A | 7/1986 | Koziol | |
| 4,810,856 A | 3/1989 | Jovanovic | |
| 4,817,514 A | 4/1989 | Hitch et al. | |
| 4,865,864 A | 9/1989 | Rijswijck | |
| 4,882,985 A | 11/1989 | Beller | |
| 5,057,331 A | 10/1991 | Levinson | |
| 5,158,066 A | 10/1992 | Dodgen | |
| 5,205,207 A | 4/1993 | McGuire | |
| 5,339,726 A | 8/1994 | Poulson | |
| 5,361,686 A | 11/1994 | Koopman | |
| 5,380,662 A | 1/1995 | Robbins et al. | |
| 5,431,093 A | 7/1995 | Dodgen | |
| 5,445,064 A | 8/1995 | Lopata | |
| 5,445,065 A | 8/1995 | Lopata | |
| 5,471,915 A | 12/1995 | Lopata | |
| 5,560,285 A | 10/1996 | Moreth | |
| 5,598,769 A | 2/1997 | Luebke et al. | |
| 5,639,497 A | 6/1997 | Bedford et al. | |
| 5,676,459 A | 10/1997 | Bedford et al. | |

(Continued)

*Primary Examiner* — Tu B Hoang
*Assistant Examiner* — Hemant Mathew
(74) *Attorney, Agent, or Firm* — Lerner, David, Littenberg, Krumholz & Mentlik, LLP

(57) ABSTRACT

A stand-alone oven capable of being utilized in both the horizontal and vertical orientations/positions to, among other functions, provide for rotisserie cooking of foodstuffs. The oven includes a rotisserie attachment that is adjustable to rotate in the oven in the horizontal and vertical orientation. A control panel is coupled to the oven to control the operation of the oven and includes a screen that is rotatable to be viewable in the horizontal and vertical orientation of the oven.

9 Claims, 13 Drawing Sheets

U.S. PATENT DOCUMENTS

| | | | | |
|---|---|---|---|---|
| 5,767,487 | A | 6/1998 | Tippmann | |
| 5,782,168 | A | 7/1998 | Krhnak | |
| 5,793,023 | A * | 8/1998 | Hong et al. | 219/685 |
| 5,801,362 | A * | 9/1998 | Pearlman et al. | 219/400 |
| 5,819,639 | A | 10/1998 | Spell | |
| 5,832,811 | A | 11/1998 | King | |
| 5,845,563 | A * | 12/1998 | Haring et al. | 99/419 |
| 6,012,444 | A | 1/2000 | Skender | |
| 6,131,505 | A | 10/2000 | Lin | |
| 6,138,553 | A * | 10/2000 | Toebben | 99/421 H |
| 6,167,800 | B1 * | 1/2001 | Su | 99/421 H |
| 6,213,002 | B1 | 4/2001 | Batten et al. | |
| 6,240,838 | B1 | 6/2001 | Backus et al. | |
| 6,253,665 | B1 | 7/2001 | Backus et al. | |
| 6,330,853 | B1 | 12/2001 | Yu | |
| 6,343,544 | B1 | 2/2002 | Bellion | |
| 6,363,836 | B1 * | 4/2002 | Usherovich | 99/339 |
| 6,382,085 | B1 * | 5/2002 | Dotan | 99/331 |
| 6,418,835 | B1 * | 7/2002 | Lin | 99/421 H |
| 6,422,136 | B1 | 7/2002 | Backus et al. | |
| 6,465,760 | B1 * | 10/2002 | Wong | 219/398 |
| 6,500,666 | B1 | 12/2002 | Clements-Macak et al. | |
| 6,509,549 | B1 * | 1/2003 | Chasen et al. | 219/386 |
| D470,708 | S * | 2/2003 | Young | D7/324 |
| 6,526,877 | B2 | 3/2003 | McConnell | |
| 6,536,334 | B2 | 3/2003 | Backus et al. | |
| 6,539,842 | B1 * | 4/2003 | Chapman et al. | 99/342 |
| 6,561,083 | B2 * | 5/2003 | Hsu | 99/421 H |
| 6,639,187 | B2 * | 10/2003 | Arel et al. | 219/388 |
| 6,658,991 | B2 | 12/2003 | Backus et al. | |
| 6,742,445 | B2 | 6/2004 | Backus et al. | |
| 6,782,806 | B2 | 8/2004 | Backus et al. | |
| 6,809,297 | B2 * | 10/2004 | Moon et al. | 219/400 |
| 6,810,792 | B1 | 11/2004 | Knight | |
| 6,837,150 | B2 | 1/2005 | Backus et al. | |
| 6,943,321 | B2 | 9/2005 | Carbone et al. | |
| 6,965,095 | B1 * | 11/2005 | Popeil et al. | 219/403 |
| 6,998,593 | B2 * | 2/2006 | Lee | 219/752 |
| 7,021,204 | B2 | 4/2006 | Backus et al. | |
| 2002/0108502 | A1 * | 8/2002 | Kim | 99/419 |
| 2003/0101877 | A1 * | 6/2003 | Backus et al. | 99/419 |
| 2004/0099146 | A1 * | 5/2004 | Sekiya | 99/419 |
| 2005/0274712 | A1 * | 12/2005 | Gagas et al. | 219/494 |

* cited by examiner

VERTICAL AND HORIZONTAL OVEN

CROSS-REFERENCE TO RELATED APPLICATIONS

This present application claims the benefit of U.S. Provisional Patent Application Ser. No. 60/791,737, filed Apr. 13, 2006, the disclosure of which is hereby incorporated herein by reference.

BACKGROUND OF THE INVENTION

The present invention relates to an oven apparatus, and more particularly, to an oven apparatus capable of several operations, including a rotisserie operation, while being situated in both horizontal and vertical orientations.

Both stand-alone oven units and rotisserie ovens have been well-known for some time. The former is often utilized as a supplement to a standard kitchen oven. With regard to the latter, while initially geared towards restaurants and other mass cooking facilities, recent years have found the rotisserie oven making its way into the typical household. Whether in the form of grill attachments, or the more pertinent stand-alone rotisserie units, the rotisserie oven has surely been adopted by the general public as a viable option for cooking meat, fish and vegetables.

Heretofore, such household stand-alone oven units, whether capable of a rotisserie function or not, have merely come in either horizontal and vertical formats. This necessarily requires a consumer to determine which of the orientations better fits their ultimate use. Kitchen size and/or counter space may dictate one or the other. However, this may often change and result in the other, non-selected orientation, being more suited for use.

Therefore, there exists a need for a stand-alone oven unit capable of rotisserie functions and of being utilized in both the horizontal and vertical orientations.

SUMMARY OF THE INVENTION

The present invention is directed to a rotisserie oven which may be utilized while situated in both horizontal and vertical orientations. Depending upon the particular orientation, the oven may be utilized to bake, broil, toast and rotisserie foodstuffs, such as meats, fish and vegetables. It is contemplated to allow all or only some of the above-noted functions in each of the horizontal and vertical orientations. For example, baking and broiling may only be available when said oven is in the horizontal position, while the rotisserie function may be available when the oven is in both the horizontal and vertical orientations. However, it is to be understood that different ovens may be constructed in accordance with the present invention that allow different functions depending upon the particular orientation.

In a preferred embodiment, the rotisserie oven includes an oven body defining an interior and having a bottom surface and a side surface, and a door for blocking an opening to the interior. A rotisserie attachment is disposed in the interior of the oven body for holding food. The rotisserie attachment is attachable to the oven body in at least two positions to enable the rotisserie to hold and rotate food for cooking when the oven is orientated on either the bottom surface or the side surface. The rotisserie is capable of being adjustable in length for disposition in either of the at least two positions.

The rotisserie attachment may include at least two rods with first and second ends coupled between at least two plates. One of the plates may include at least two short posts and at least two long posts, where the first ends of the rods are capable of being coupled to both the short and long posts. The short and long posts may have interior openings sized to receive the first ends of the rods but the interior openings may have equal depths. The short posts may have an exterior length that is shorter than an exterior length of the long posts. The first ends of the rods may be connected to the short posts to permit the rotisserie attachment to rotate when the oven is orientated on the side surface, and may be connected to the long posts to permit the rotisserie attachment to rotate when the oven is orientated on the bottom surface. The oven may include at least one heating element disposed in the interior of the body where at least one heating element may be rotatable. The oven may be utilized with a basket, rotisserie attachment, and a pan. The oven body may be cylinder-shaped. A control panel may disposed on the exterior of the oven body and may have a screen that is read and used when the oven body is orientated on either the bottom surface or the side surface. The control panel may be movable between at least two positions when the oven body is orientated on either the bottom surface or the side surface. The screen may be an LCD screen or a touch screen.

In a preferred embodiment, the oven may include an oven body defining an interior and having a bottom surface and a side surface, and a door for blocking an opening to the interior. A control panel is disposed on the exterior of the oven body. The control panel has a screen that is read and used when the oven body is orientated on either the bottom surface or the side surface. The control panel is movable between at least two positions when the oven body is orientated on either the bottom surface or the side surface. The control panel may include at least one tab for moving the screen to be read and used when the oven body is orientated on either the bottom surface or the side surface.

In a preferred embodiment, a method of using a rotisserie oven that includes providing an oven body with a bottom surface and a side surface, having a control panel disposed on the exterior of the oven body, wherein the control panel has a movable screen to be read and used when the oven body is orientated on either the bottom surface or the side surface. The oven body is orientated on either the bottom surface or the side surface. The control panel is moved between at least two positions to permit the screen to read and used when the oven body is orientated on either the bottom surface or the side surface.

BRIEF DESCRIPTION OF THE DRAWINGS

A more complete appreciation of the subject matter of the present invention and the various advantages thereof can be realized by reference to the following detailed description in which reference is made to the accompanying drawings in which.

DETAILED DESCRIPTION

The following generally depicts the present invention in certain contemplated embodiments. Of course, the included descriptions and drawings are only representative of the invention as a whole, and such may vary from that which is disclosed herein.

One embodiment of the present invention is an electric oven that can operate while being situated in both horizontal and vertical positions/orientations. The oven can preferably perform cooking operations such as baking, broiling, toasting, and rotisserie. Some of these operations/functions may be carried out while the oven is in one orientation or the other, or both. Clearly, this may vary depending upon the particular oven. For example, in one embodiment, the oven may be capable of being utilized as a broiler, toaster and rotisserie, while in the horizontal orientation, and only as a rotisserie, while in the vertical orientation. However, other ovens are contemplated with different functions available in different orientations. For instance, an oven is envisioned which is capable of all functions in both orientations.

Figure 1:
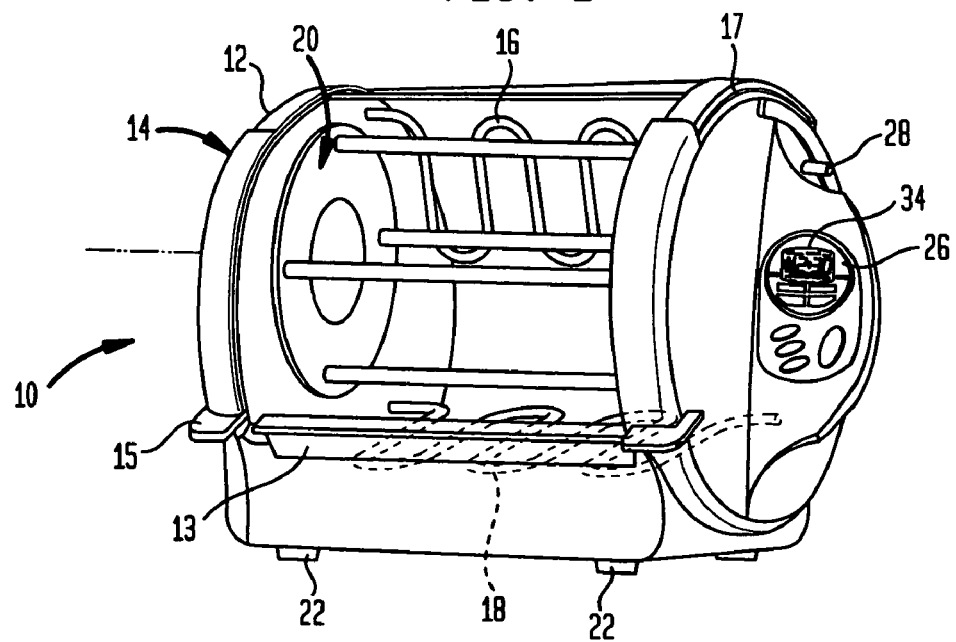
FIG. 1 is a perspective view of the oven positioned in a horizontal orientation in accordance with a preferred embodiment of the present invention.
Figure 6:
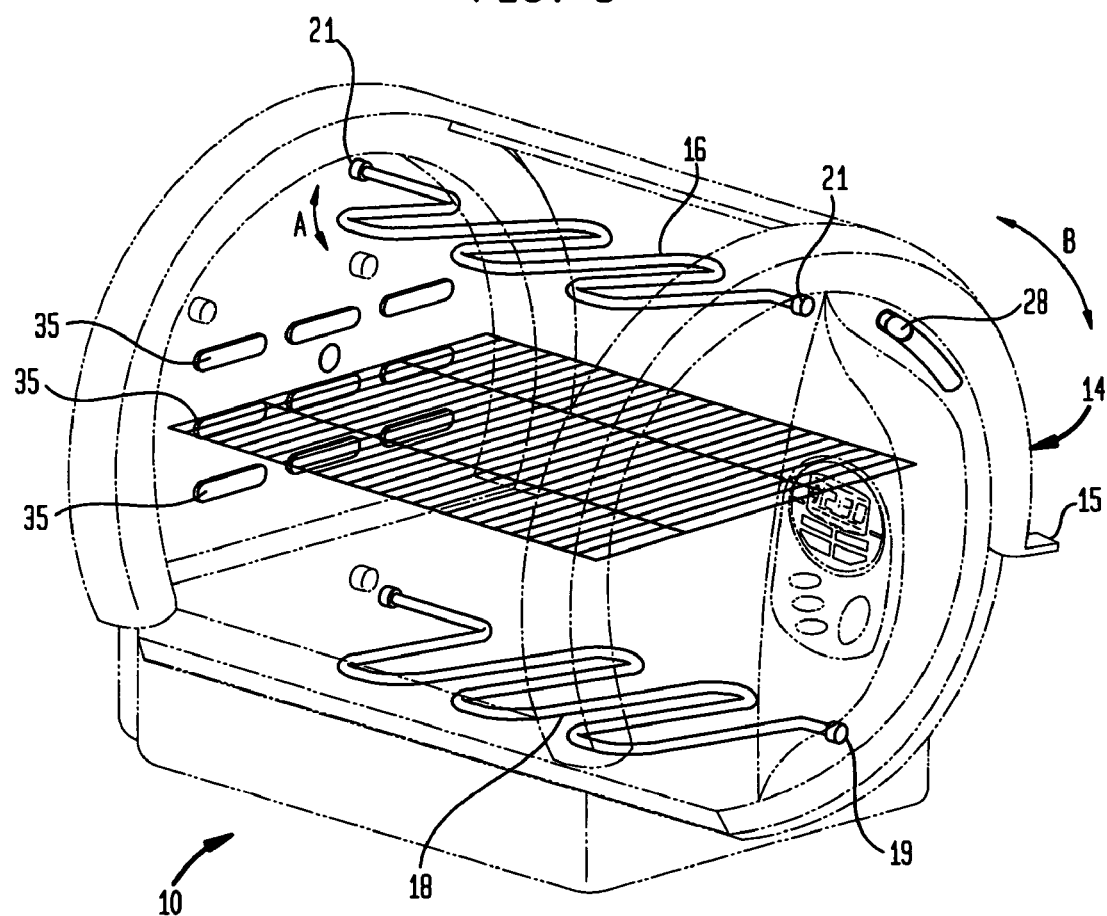
FIG. 6 is a rear partial cutaway view of the oven of FIG. 4 showing a lever to move the top heating element.

Referring to the figures, FIG. 1 depicts a perspective view of an oven 10 positioned in a horizontal orientation in accordance with the preferred embodiment of the invention. The oven 10 preferably has a body 12 defining an interior with a door 14 capable of selectively covering and uncovering an opening which allows access to the interior. The door 14 includes one or more and may be opened by rotating such along a hinge, sliding such along a path, or in any other fashion well-known in the art. For example, as shown, the door 14 includes handles 15 for grabbing the door and sliding it across a channel 17 on the curved surface of the oven body 12, to cover and uncover the opening. The oven preferably includes a rotatable control panel 26 that can be rotated to allow the user to properly view a LCD screen 34 thereon while the oven 10 is situated in both the horizontal and vertical orientations. The oven 10 preferably also includes one or more heating elements 16, 18 capable of providing the necessary wattage for cooking various foodstuffs. In this regard, it is noted that any number of heating elements, providing any amount of wattage may be included, such as heating elements 16, 18 shown with an overall wattage of approximately 1500 watts. In the preferred embodiment shown, the top or left side heating element 16 is 900 watts and the bottom or right side heating element 18 is 600 watts. This difference in wattage preferably provides for improved performance in the rotisserie mode. In addition, the first element 16 can rotate approximately 90 degrees. The ability to rotate the heating element may permit different cooking operations, and may aid in the cleaning of the oven. It is to be understood that any number of the overall heating elements may be designed to be moveable, including each of the included heating elements 16, 18. The movement permitted to such heating elements may not only encompass rotation, but also translation along selected paths. In addition, a lever 28 may be provided and be capable of translational movement which is translated into rotational movement of the top heater 16, as best shown in FIG. 6.

While situated in the horizontal orientation (best shown in FIGS. 1 and 2), the oven 10 may be capable of cooking functions, such as bake, broil, toast, and/or rotisserie. A rotisserie attachment 20 preferably aids in the rotisserie operation including self-basting of the foodstuffs being cooked, as juices coming from the article of food tend to flow to different areas of the food. In the horizontal orientation, the heating elements 16, 18 will preferably be situated in top and bottom positions for cooking. Given the tendency for juices or fat to drip downward (if not self-basted), it is contemplated to not utilize the bottom heating element 18 in this orientation, as such would be located directly below where juices or the like would drip. An accessory door 13 allows a drip tray or other accessory to be inserted into the oven and disposed above the bottom heating element 18, thereby preventing such undesirable dripping onto element 18 from occurring.

Figure 2:
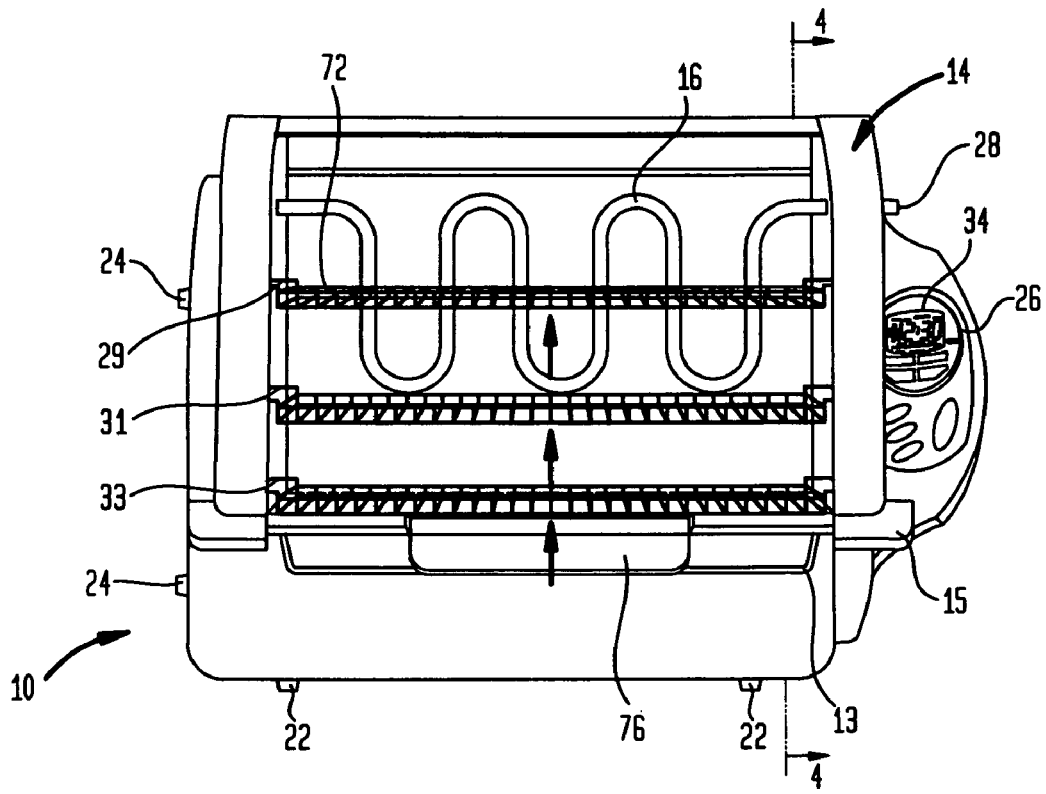
FIG. 2 is a perspective view of the oven of FIG. 1 with an installed rack.

Referring to FIG. 2, when the bottom heating element 18 is not utilized, a removable drip tray 76 may be inserted through door 13 and disposed above the bottom heating element 18 for collecting drippings. However, it is contemplated to use the bottom heating element 18 while the oven 10 is in the horizontal orientation, although such would likely require additional clean up to remove material which may drip thereon. In either case, the top heating element 16 may be rotated to different positions for a rotisserie function, as explained below in detail. In addition, a rack 72 or other accessory can be utilized while the oven is in the horizontal orientation, and such accessories can be set at different positions within the oven for holding different foodstuffs. For example, the rack 72 may be set at one of three different levels 29, 31, 33 upon rack supports 35 on each sidewall (one side wall shown in FIG. 6) within the oven. Of course, utilization of such a rack would be in lieu of the rotisserie attachment. Four horizontal support feet 22 (only two are shown) are also provided on the exterior bottom side of the oven 10 to support the oven in the horizontal orientation. Likewise, four vertical support feet 24 (only two are shown in FIG. 2) are provided on the exterior left side of the oven 10 to support the oven when it is situated in the vertical orientation as explained below.

Figure 3:
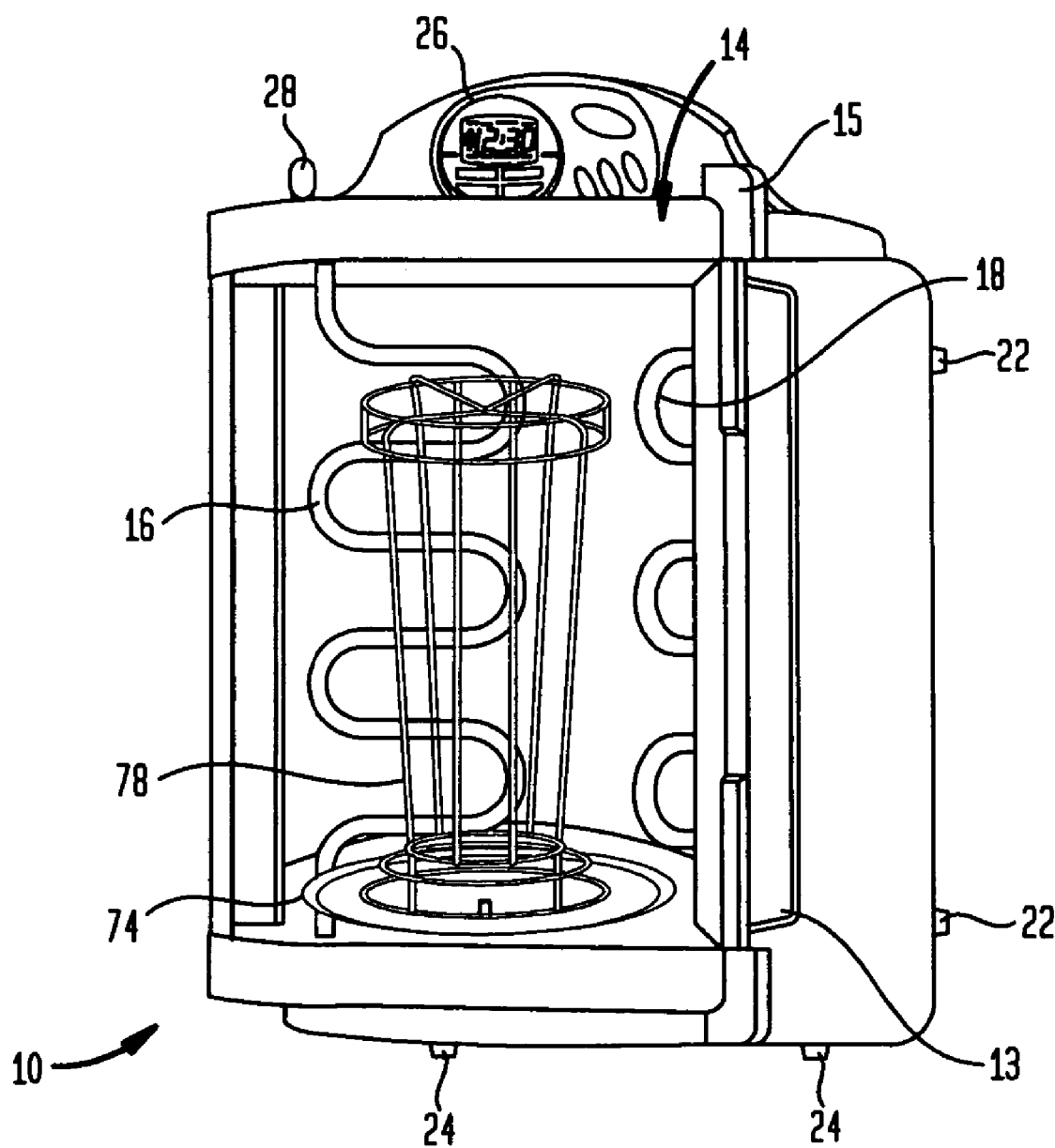
FIG. 3 is a perspective view of the oven of FIG. 1 in a vertical orientation.
Figure 4:
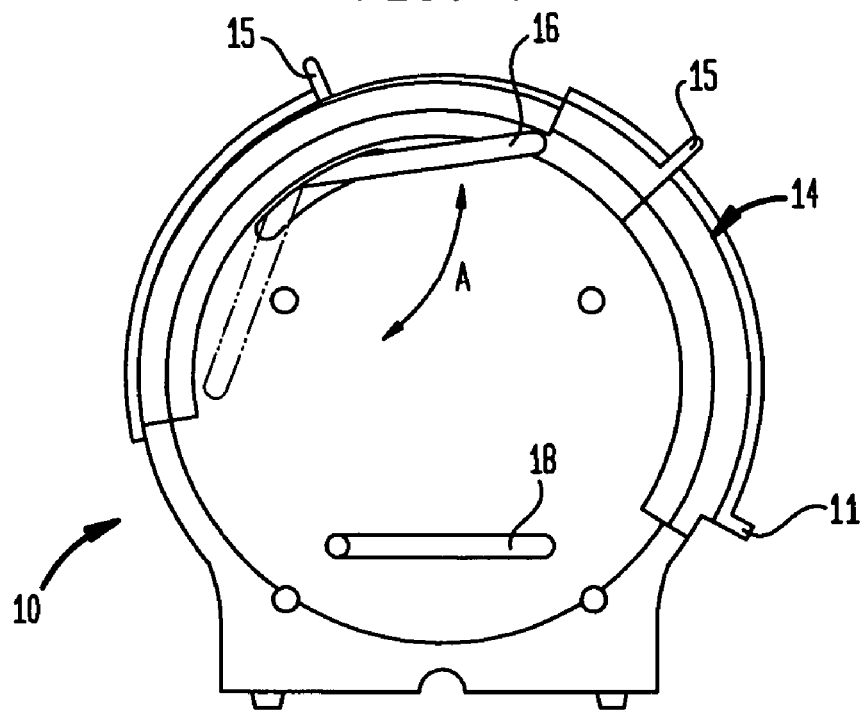
FIG. 4 is a left side cross sectional view of FIG. 2, generally along line 4-4, showing the top heating element orientated roughly parallel to the bottom heating element.
Figure 5:
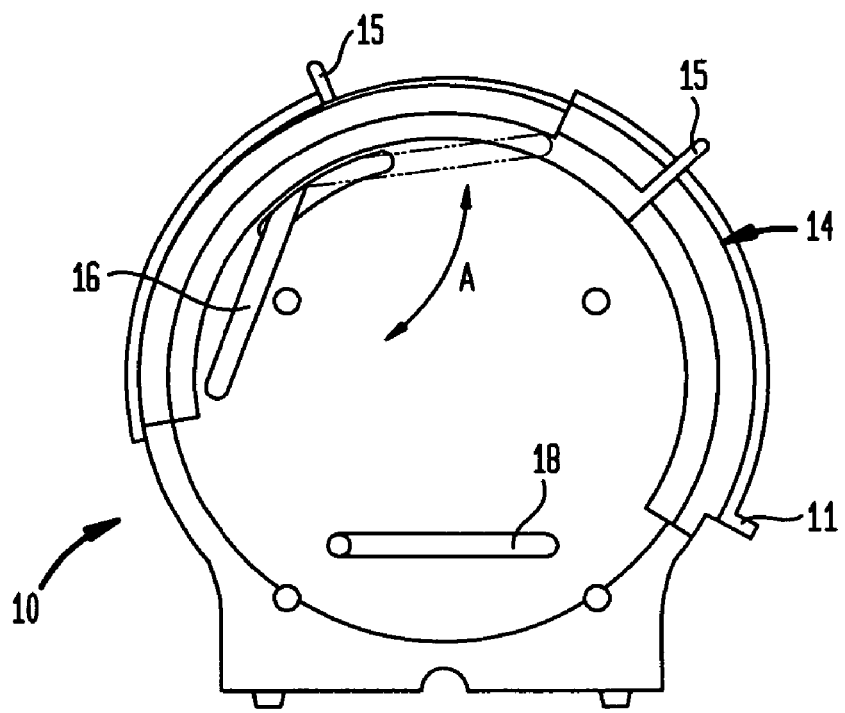
FIG. 5 is a view similar to that of FIG. 4 showing the top heating element roughly perpendicular to the bottom heating element.

FIG. 3 is a perspective view of the oven 10 of FIG. 1 situated in the vertical orientation. While situated in the vertical orientation, the oven 10 may be capable of similar, if not identical cooking functions to those performed while in the horizontal orientation. During operation, the rotatable control panel 26 is rotated to properly view the LCD screen 34 in the vertical orientation. In the vertical orientation, cooking may be done with both heating elements 16, 18 being utilized to give off 1500 watts of total heat, and without concern for juices or the like dripping onto one of the heating elements. This is particularly useful for the rotisserie operation, as both elements may be utilized while the foodstuffs are being rotated. Thus, cooking time may be decreased, and the overall uniformity of the cooking function may be improved. In addition, cooking in this vertical orientation may allow for fat or oil to be cooked away and ultimately dripped away from the food. A circular drip tray 74 may be utilized, for example, with a rotisserie attachment 20 or a rotisserie basket 78 in order to catch such material Referring to FIGS. 4 to 6, shown is the oven 10 in the horizontal orientation and the positioning and adjustability of one or more of the heating elements, such as the top heating element 16. The top heating element 16 is supported by insulating support washers 21 on each side wall within the oven, as best shown in FIG. 6. The top heating element 16 can be adjusted to many different positions. For example, FIG. 4 shows the top heating element 16 in the top position (top side of the oven) which is roughly parallel to the bottom heating element 18. On the contrary, FIG. 5 shows the top heating element 16 moved downward to the rear position (rear side of the oven) which is roughly perpendicular to the bottom heating element 18. This may be done, for example, by sliding lever 28 (FIG. 6) in a slot on the right side of the oven when the oven is in the horizontal orientation or on the top of the oven when in vertical orientation. The lever 28 provides translational movement (movement depicted by arrow B) which translates into rotational movement (movement depicted by arrow A) of the top heating element 16 about insulating support washers 21. Other adjusting mechanisms may also be utilized. The adjusting of the heating elements may permit multiple types of cooking. Like the top heating element 16, the bottom heating element 18 is supported by insulating support washers 19 within the oven, as best shown in FIG. 6. Different heating elements positional aspects are described, but it is to be understood that other aspects are contemplated. The heating elements 16, 18 may be pipe heaters which are preferably shaped in a sine-wave type pattern for maximum heating of the intended area. However, any other type of suitable and well-known heating element may be employed, such as those that utilize infrared heating technology. In addition, shown in FIGS. 4 to 6 are details of the door 14 as it is moved to the open position. In particular, the door 14 is opened by grabbing the handle 15 and lifting upward away from stopper element 11 on the oven. Conversely, the door is closed by grabbing the handle 15 and pushing downward until the bottom portion of the handle abuts stopper element 11 which prevents further downward movement.

Referring to FIGS. 7 to 14, shown is a preferred embodiment of a rotisserie attachment 40 for holding and rotating food during a rotisserie operation while the oven is in both the horizontal and vertical orientation. As described above, the oven 10 can be used as a rotisserie in both the horizontal and vertical orientations. The rotisserie attachment 40 used in connection with the present invention requires that the attachment be situated in two different configurations, horizontal and vertical.

Figure 9:
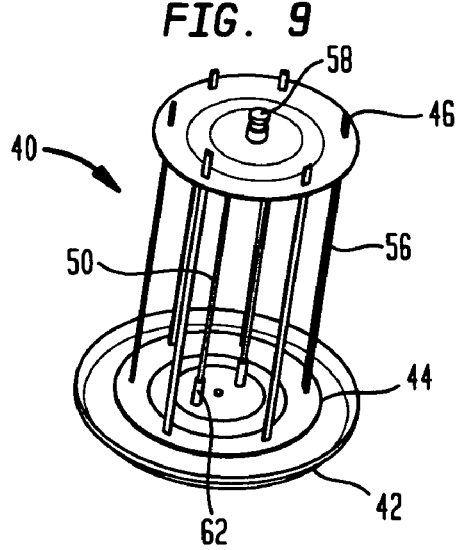
FIG. 9 is a top perspective view of a rotisserie attachment in accordance with the present invention.
Figure 10:
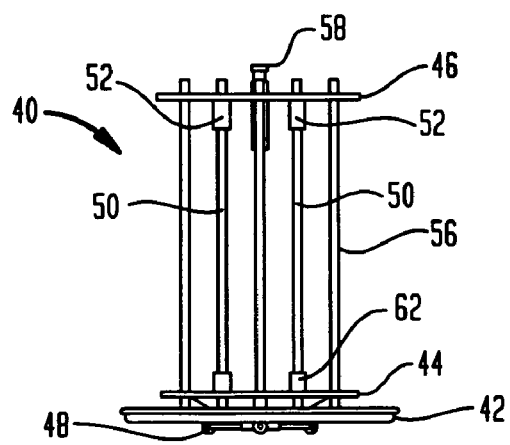
FIG. 10 is a front view of the rotisserie attachment of FIG. 9.
Figure 11:
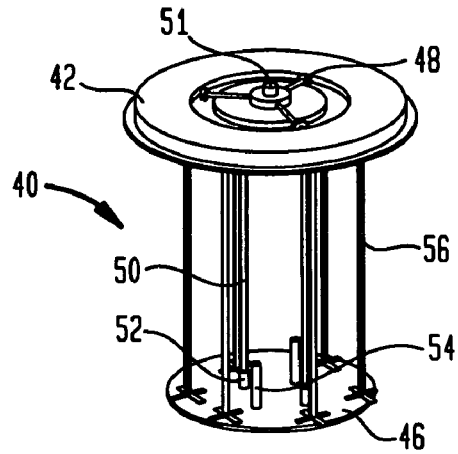
FIG. 11 is a bottom perspective view of the rotisserie attachment of FIG. 9.

When the oven is in a horizontal orientation (see FIG. 7), the rotisserie attachment 40 has one end rotatably coupled to a motor 47 disposed on the left interior side wall of the oven, and a second end rotatably coupled to a bracket 49 on the right interior side wall which allows free rotation. Operation of the motor 47 causes the rotisserie attachment 40, and any food disposed thereon, to rotate about its central axis (this rotation is depicted by arrow C). In the vertical orientation, the same motor 47 rotates the rotisserie attachment 40 about its central axis (this rotation is depicted by arrow D). However, when the oven is in the vertical orientation (see FIG. 8), the rotisserie attachment 40 rests on the left side of the oven 10 where the motor 47 resides and causes a concentrated load directly on the motor. In order to alleviate this concentrated load, as well as to provide a capture for juices and fat, a circular combination drip pan and support 42 is provided, as is best shown in FIGS. 9 and 10. This pan/support 42 preferably includes a wheel assembly 48 (FIG. 11) with two or more wheels located underneath the support, which provide easy rotation of the pan/support 42 and rotisserie attachment 40 during a rotisserie function. In addition, the pan/support 42 provides for a more uniform load to be directed to the wheels, rather than the motor.

However, the drip pan 42 and its wheel assembly 48 add additional height to the rotisserie attachment 40. This presents a problem in fitting the attachment 40 into the oven when in the vertical orientation. In a preferred embodiment, the length of the rotisserie attachment 40 is capable of being changed for use in the horizontal and vertical orientations. In accordance with the present invention, referring to FIGS. 12 and 13, the rotisserie attachment 40 includes a lower or left side plate 44 and an upper or right side plate 46 connected by two connection rods 50 disposed therebetween. The connection rods 50 have a first end threadably coupled to the inner surface of the lower or left plate 44. In a preferred embodiment, the first end of the connection rods has posts 62 with internal threaded openings configured to threadably couple with screws 64 extending from the inner surface of the plate 44. The outer surface of the plate 44 supports a coupling member for rotatably coupling to the motor 47 on the interior left side oven wall. A support post 58 located on the exterior surface of the upper or right side plate 46 is used to rotatably couple to support bracket 49 within the oven. The second end of the two connection rods 50 can be connected to either two short posts 52 or two long posts 54 extending from the inner surface of the upper or right side plate 46. The exterior length of the short posts 52 is less than the exterior length of the long posts 54. The short posts 52 and the long posts 54 have openings 68 to receive the second end of the connection rods. The interior length or depth of the openings 68 for the short posts 52 is the same as for the long posts 54. In a preferred embodiment, the second end is sharp for piercing food items and sized to fit in the interior opening 68 of the posts 52, 54 to a achieve press-fit coupling but other coupling mechanisms known in the art can be used.

In order to change the length of the attachment 40, the connection rods 50 are inserted in either the short posts 52 or the long posts 54. For example, referring to FIG. 12, in order to put the attachment 40 in position to be utilized in a vertical orientation, the second end of the connection rods 50 is preferably inserted in the short posts 52, which reduces the overall length or height of the attachment to fit the oven in the vertical orientation. Whereas, for use in the horizontal orientation, referring to FIG. 13, the second end of the connection rods 50 is preferably inserted in the long posts 54, which increase the overall length or height of the attachment to fit the oven in the horizontal orientation.

In addition to its length adjusting capabilities, the rotisserie attachment 40 has other useful features. For example, referring to FIG. 13, six support rods 56 double as skewers that are detachable and have tabs 66 to turn the skewers when they hit a post (not shown) located in the rear of the oven. This improves the overall uniformity in cooking items such as kabobs or the like. In addition, as is noted above, referring to FIG. 11, the attachment 40 provides for a fat and juice capturing pan 42 when in the vertical orientation. As explained above, the pan 42 is designed to also be a support with wheel assembly 48 to ensure smooth rotation. In addition, referring to FIG. 14, in one embodiment, the lower or right side plate 44 can have perforations 60 to help reduce the cost of manufacture and increase heat flow.

Figure 15:
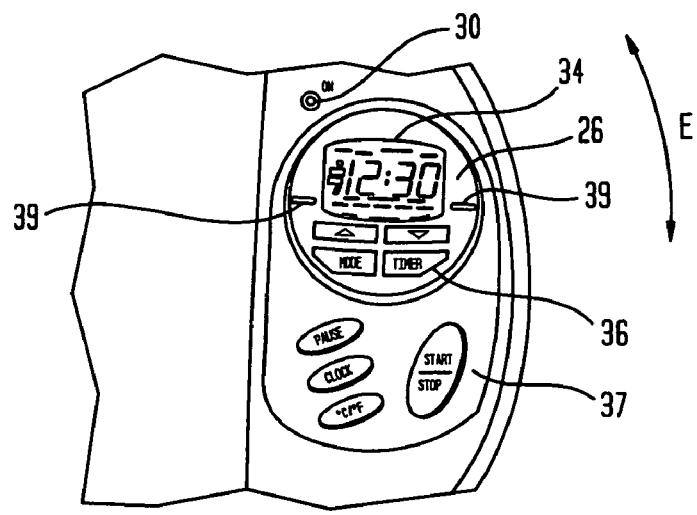
FIG. 15 is an enlarged view of the control panel of the oven of FIG. 1 in a horizontal orientation.
Figure 16:
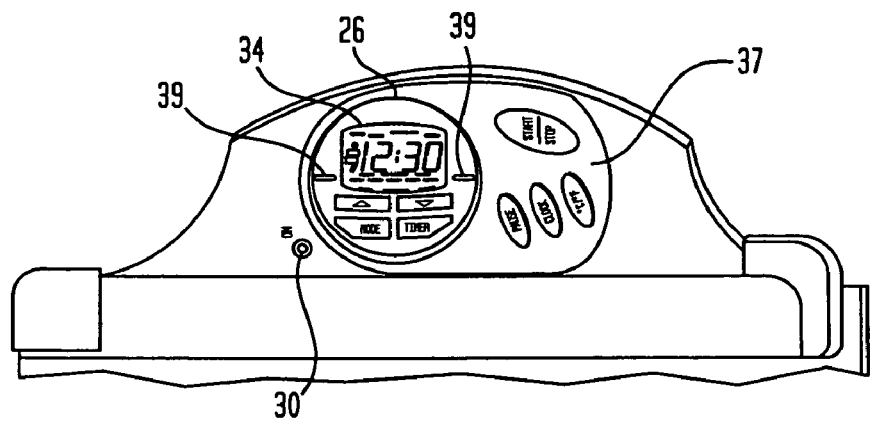
FIG. 16 is an enlarged view of the control panel of the oven of FIG. 3 in a vertical orientation.

FIG. 15 shows a detailed view of the control panel 26 of FIG. 1 in the horizontal orientation and FIG. 16 shows the panel in the vertical orientation. The control panel 26 includes the backlit LCD screen 34 with a push button control area 36. However, the use of the oven in both horizontal and vertical orientations requires that the LCD screen 34 be viewable and viewable in both positions. The LCD screen 34 of the present invention is circular and may rotate in order to be viewable from the horizontal orientation, as well as the vertical orientation. Two spaced apart tabs 39 disposed on the exterior periphery of the control panel 26 allow a user to manually rotate the control panel to a particular orientation. In the preferred embodiment, the control panel 26 slidably rotates (depicted by arrow E) with respect to the body of the oven using a groove-protrusion mechanism (not shown). The control panel can include a detent mechanism to provide a positive lock when rotated to the vertical and horizontal orientation (also not shown). While shown as being manually rotatable approximately 90 degrees, it is noted that the screen 34 may rotated any amount. In addition, it is contemplated to provide a control panel 26 or screen 34 which rotate automatically upon positioning of the oven in either orientation. Finally, it is worth noting that various buttons are also provided for allowing selection of the different oven operations. In order for such to also be viewable in both the horizontal and vertical orientations, indicia printed thereon is preferably printed so as to be at an angle easily viewable in both orientations. However, it is also contemplated to provide a screen which employs touch screen capabilities. Therefore, any touch buttons would be moveable along with the overall screen.

In a preferred embodiment, the push button control area 36 provides a user with the ability to select various cooking functions. For example, a "Mode" button allows a user to select various cooking functions displayed on the LCD screen 34 such as bake, broil, toast, horizontal and vertical rotisserie. The oven provides a pre-heat mode in which the heating elements 16, 18 turn on for faster heat up time. In this mode, the LCD screen 34 can display a flashing "LO" message as the oven heats and highlight a "Pre-heat" label on the LCD screen 34. A "Timer" button can be used to set the length of cooking time (countdown). A separate control panel 37 can provide additional functions. For example, a "Clock" button can be used to set the time of day as displayed on the LCD screen. A combination "Start/Stop" button initiates and/or terminates the heating operations and activates/deactivates the vertical and horizontal rotisserie cooking functions. A "Temp" button allows the temperature displayed on the LCD screen 34 to be switched between Fahrenheit and Celsius. A "Pause" button stops the timer countdown and the motor during the rotisserie cooking function. If the oven is left on pause for more than a predetermined period of time (e.g., 30 minutes) then the oven turns off automatically. On the control panel 26, "Up" and "Down" arrow buttons allow a user to scroll up and down information related to the "Mode", "Timer" and "Clock" buttons. A power on indicator 30, shown as a light emitting diode (LED), illuminates to show that the oven is connected to a source of AC power.

Referring to FIGS. 17 to 21, shown is an oven 100 according to another embodiment of the present invention. Like the oven 10 above, oven 100 may include one or more heating elements such as top pipe heaters 116 and bottom pipe heaters 118, and incorporate a motor to provide a slow rotation in order to achieve an even rotisserie cooking and a variety of cooking function. For horizontal cooking, top pipe heater 116 could be adjusted from the rear side to the top side by a sliding knob or lever 128. When the top pipe heater 116 is positioned in the rear side of the oven, a rotisserie function could take place. When the top pipe heater 116 is positioned on the top side of the oven, baking, toasting functions could be achieved.

Preferably, the oven 100 could stand in the horizontal orientation or in the vertical orientation such that users could choose as their cooking needs. The angle of control panel 126 (digital control) also could be adjusted to match the two orientations. An electronic setting may automatically change for the two positions, thereby allowing the oven to only perform certain operations when disposed vertically or horizontally. In this regard, a sensor inside the oven or control panel may detect the orientation of the oven, change program to control temperature, time and rotation for different types of cooking. The oven 100 has a cylinder shaped body 112 which is compatible with rotisserie function and is easy to clean since no sharp edges exist in the interior of the oven. In addition, a single piece sliding door 114 with handles 115 follows the outer curved surface of the oven and is easy to open and close by a single hand. Lifting the handle 115 upward (upward motion depicted by arrow F) opens the door 114 and moving the handle downward (downward motion depicted by arrow G) closes the door. In one embodiment, the door 114 slides on a channel 117 on the surface of the oven. An accessory door 113 allows a drip tray or other accessory to be inserted into the oven and disposed above the bottom heating element 118.

Figure 17:
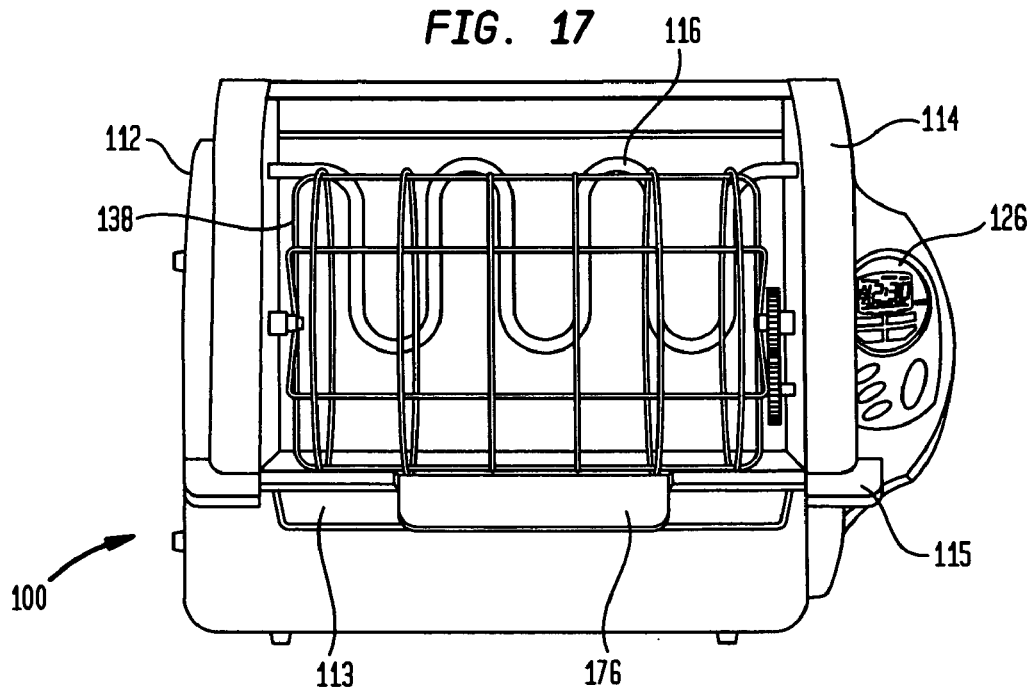
FIG. 17 is a perspective view of an oven positioned in a horizontal orientation in accordance with a second embodiment of the present invention.
Figure 18:
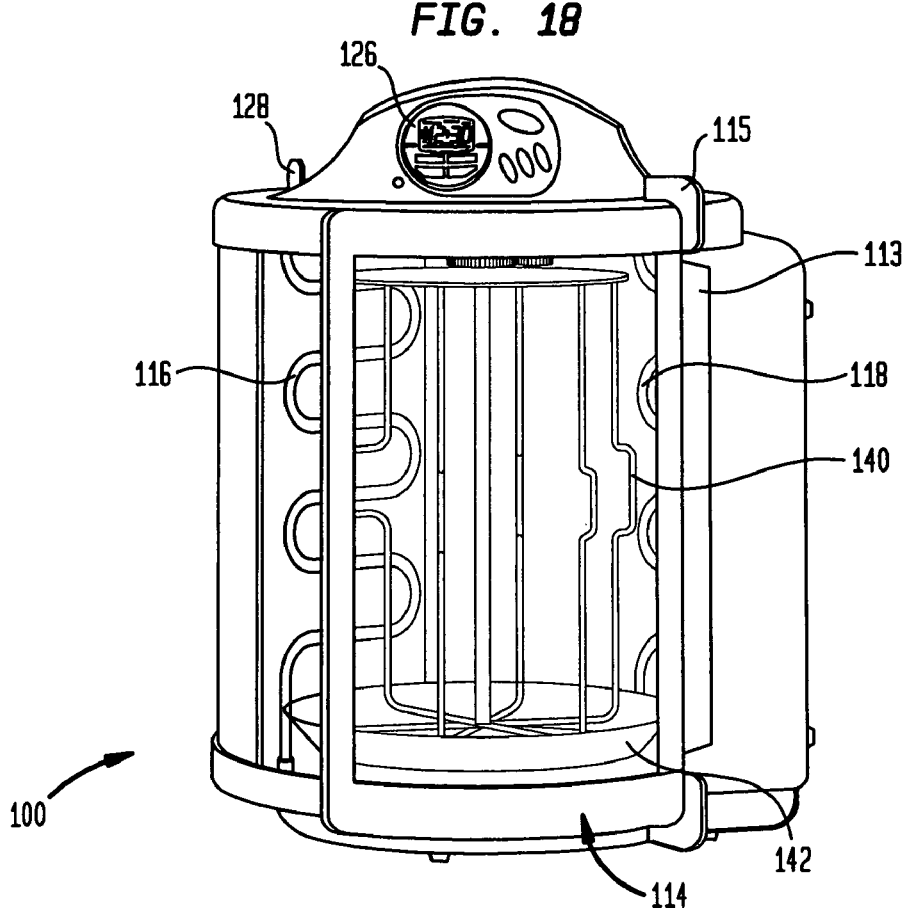
FIG. 18 is a perspective view of the oven of FIG. 17 positioned in a vertical orientation.
Figure 19:
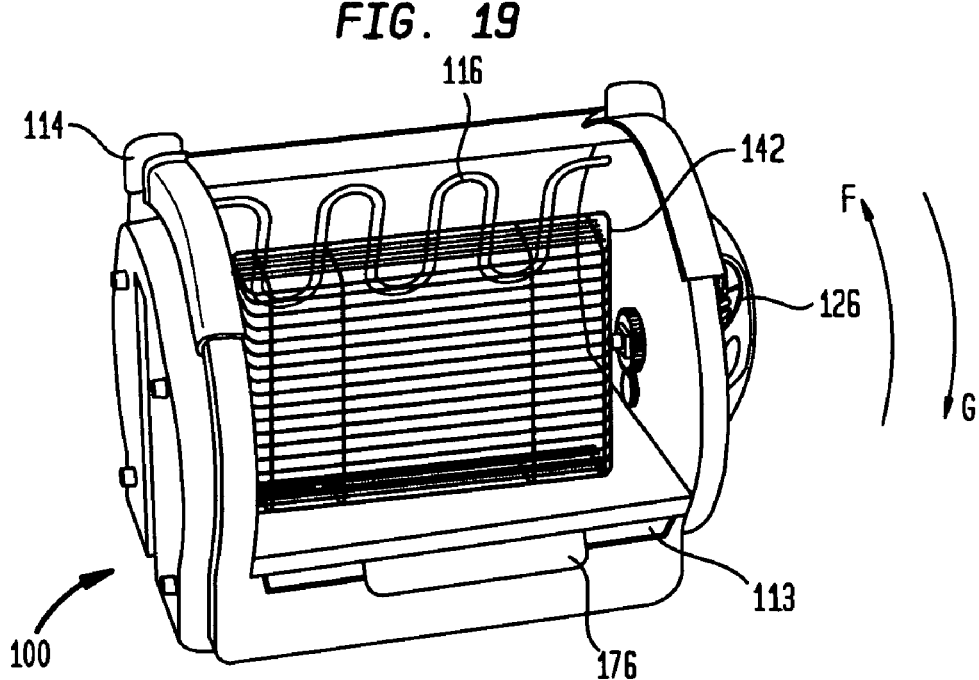
FIG. 19 is a perspective view of the oven of FIG. 17 with a door opened and a rack installed.
Figure 20:
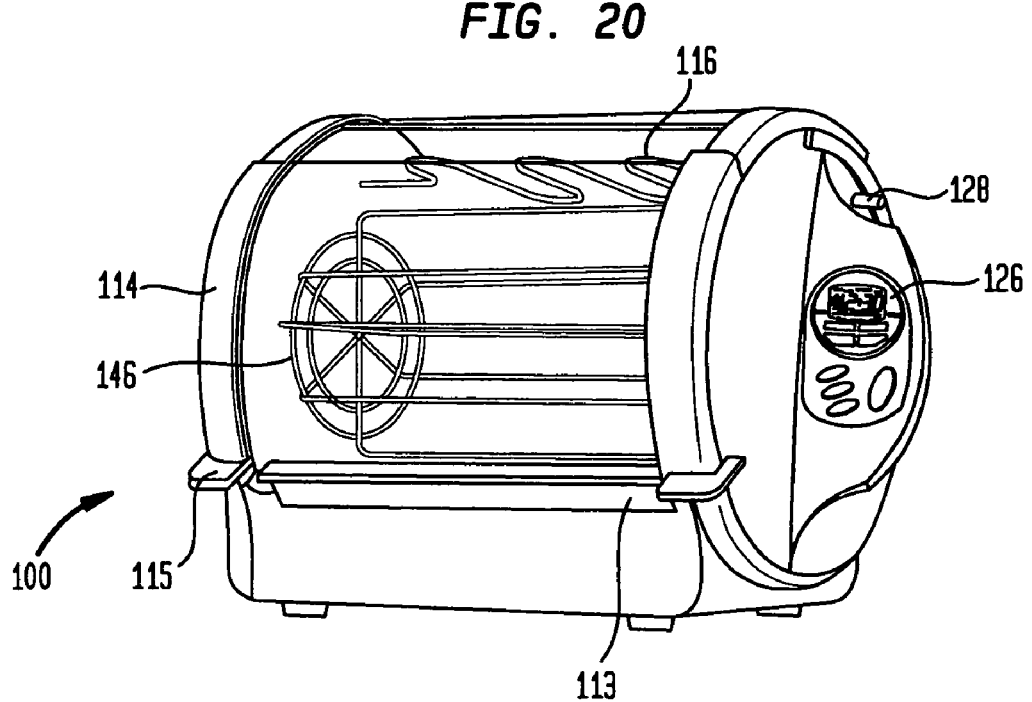
FIG. 20 is a perspective view of the oven of FIG. 17 with a door closed and a rotisserie rack installed.
Figure 21:
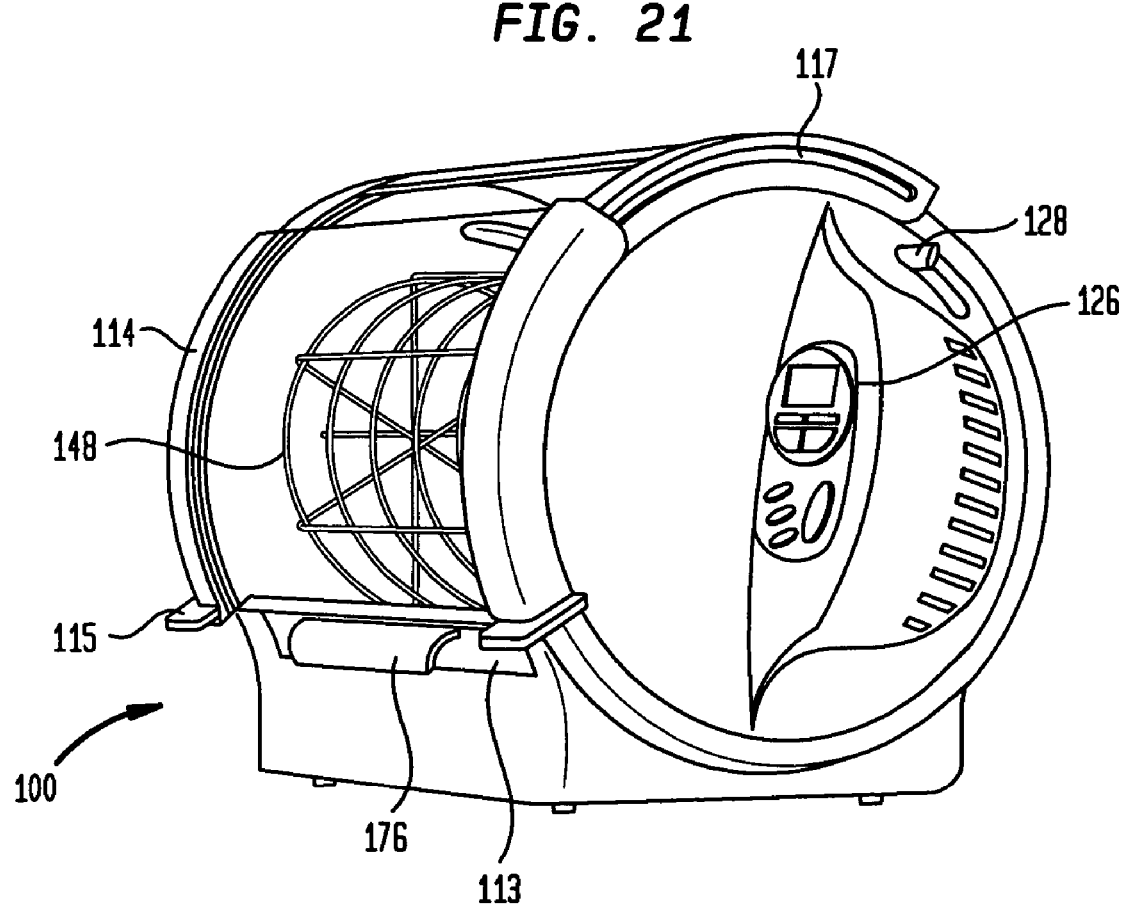
FIG. 21 is a perspective view of the oven of FIG. 17 with a door closed and a circular rotisserie rack installed.

The oven 100 can be used with various cooking accessories. For example, FIGS. 17 and 21, shows the oven 100 in the horizontal orientation with a cylindrical shaped rotatable rotisserie attachment 138 and a drip pan 176 inserted through door 113. FIG. 18 shows the oven 100 in the vertical orientation with another embodiment of a rotatable rotisserie attachment 140 and drip pan assembly 142 but without the drip pan 176. FIG. 19 shows the oven 100 in the horizontal orientation with a rotatable wire basket 142 and drip pan 176. FIG. 20 shows the oven 100 in the horizontal orientation with another embodiment of a rotisserie attachment 146 and without the drip pan 176.

Figure 22:
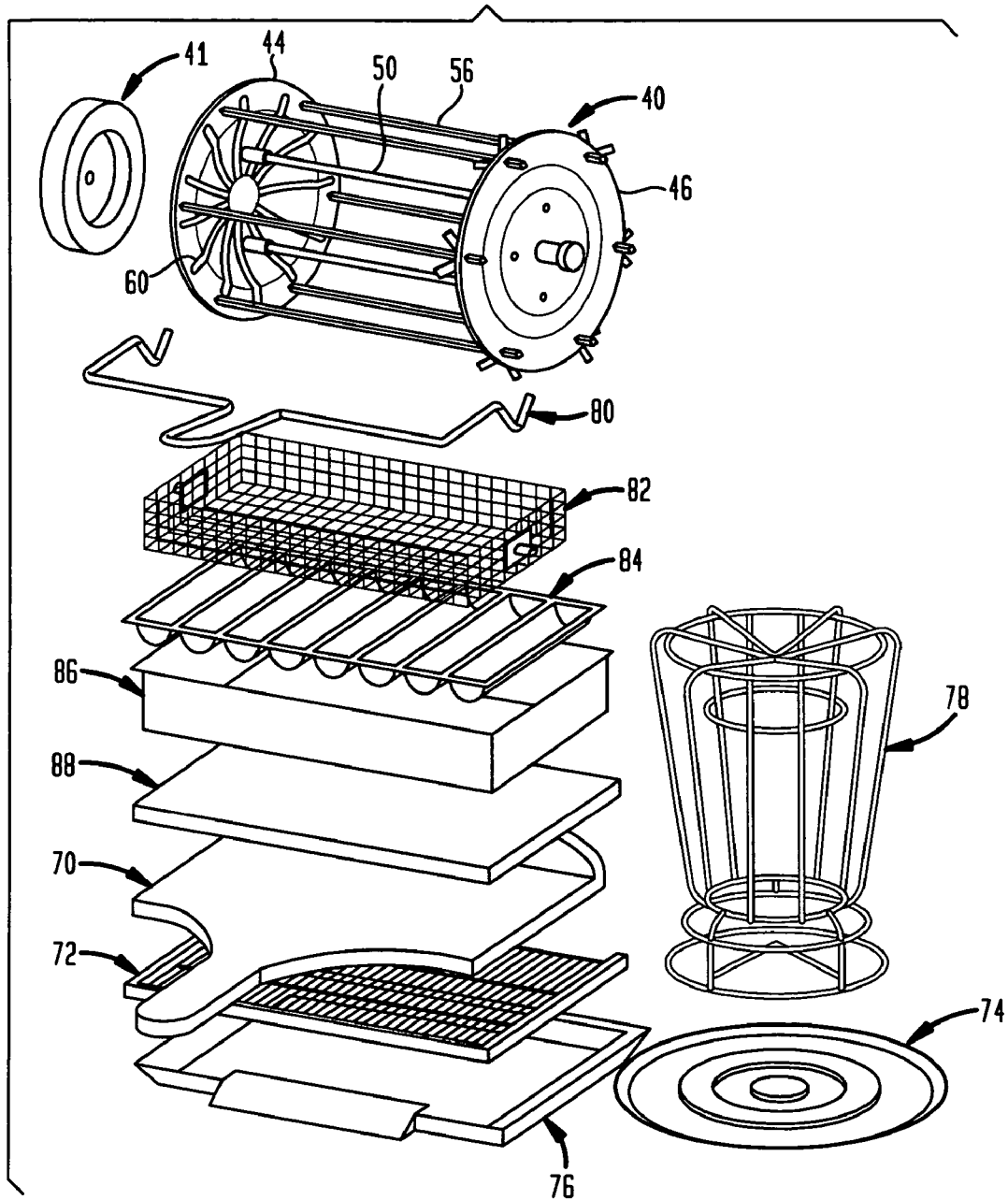
FIG. 22 is a perspective view depicting various accessories for use with the oven of the present invention.

Referring to FIG. 22, shown are other accessories for use with the oven of the present invention. The accessories may be provided for use with the oven such that baking, broiling, toasting and rotisserie could be achieved. Some accessories may be designed for vertical cooking, while some may be designed for horizontal cooking. For example, when horizontal cooking, a rotisserie attachment remover 80 can be used to move the rotisserie attachment 40 in or out of the oven. A "U" shaped handle on the rotisserie remover 80 provides a means for gripping the remover and notches on the opposite end of the remover supports the bottom portion of the rotisserie attachment 40. A stand 41 can provide vertical support for the rotisserie attachment 40 when not in use. When horizontal cooking, a wire basket 82 with support posts on each end can be attached to the oven for rotation, like the rotisserie attachment. A broiling insert 84, which has "U" shaped troughs to hold food items for broiling, can be attached to the interior rack supports of the oven. A baking pan 86 can also be attached to the rack supports of the oven for baking bread or other food items. A pizza stone 88 and a pizza paddle 70 can be used to prepare pizza or other food items. The rack 72 can be used to cook meats or other food items in the oven when in the horizontal orientation. The circular drip tray 74 can be placed underneath the rotisserie rack 78 to catch juices from meat or the like. In a similar manner, the rectangular drip tray 76 can be placed in the oven when in the horizontal orientation to catch juices: or other food stuff during the operation of the oven.

Figure 7:
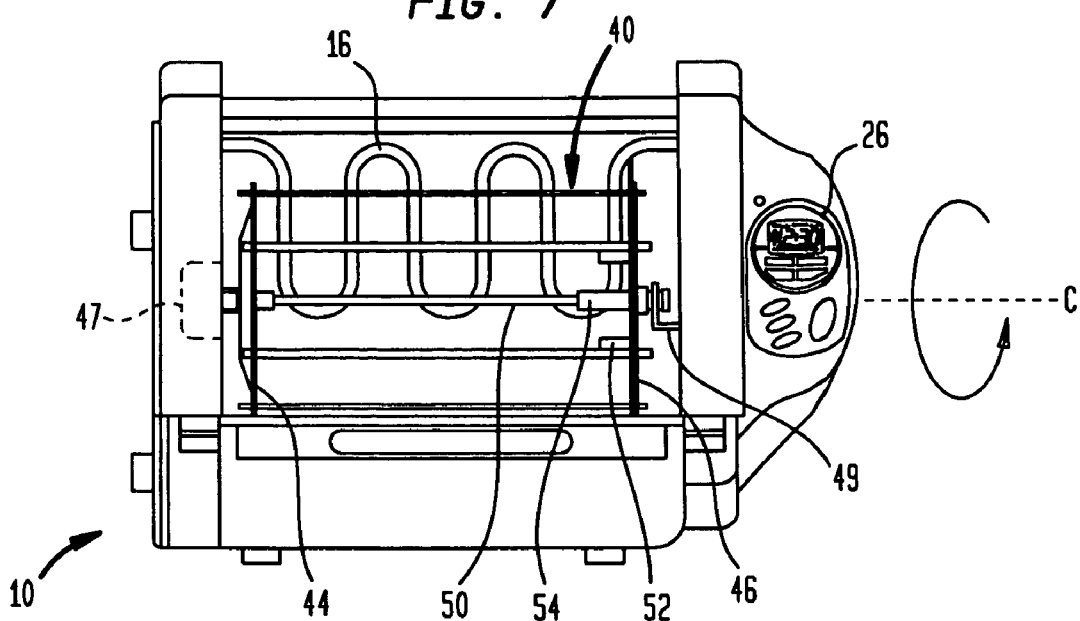
FIG. 7 is a front view of the oven of FIG. 1 in the horizontal orientation.
Figure 13:
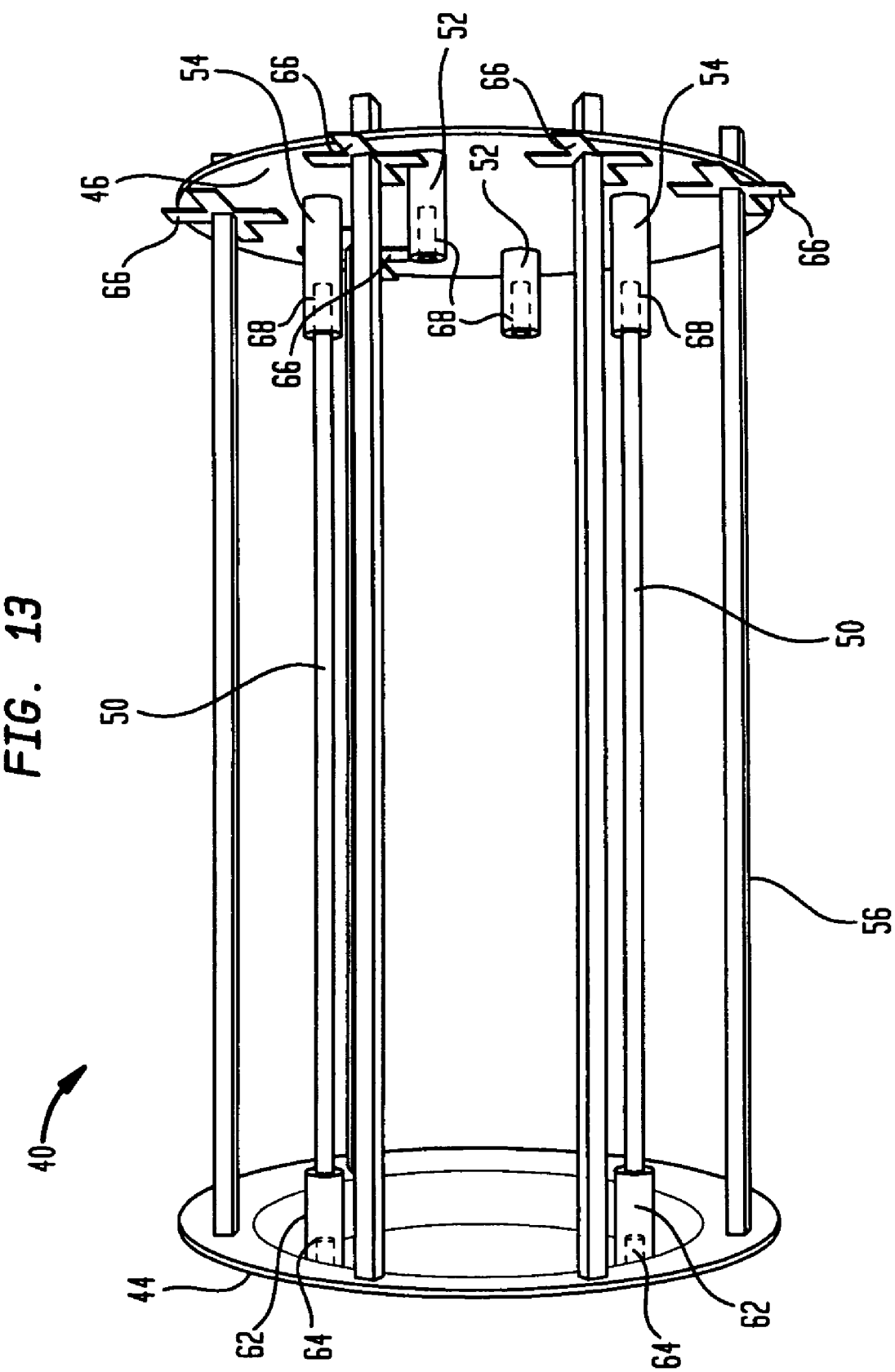
FIG. 13 is a front perspective view: of the rotisserie attachment of FIG. 9, situated for use in a horizontally oriented oven.
Figure 14:
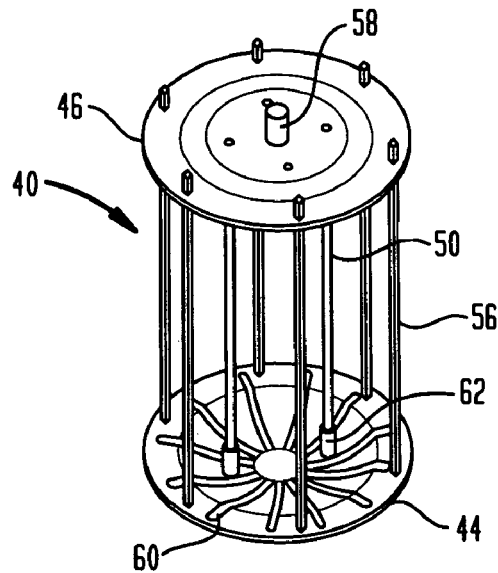
FIG. 14 is a top perspective view of the rotisserie attachment of FIG. 13.

The oven of the present invention allows a user to easily configure the oven in the horizontal and vertical orientation to provide various cooking functions, such as bake, broil, toast, and/or rotisserie. To illustrate, assume a user desires to use the horizontal rotisserie function of the oven as shown in FIG. 1 or 7. The user simply configures or adjusts the rotisserie attachment 40 for operation in the horizontal orientation, as shown in FIG. 13. The desired food items to be cooked are attached to the rotisserie attachment and the rotisserie remover 80 (FIG. 22) is placed underneath the attachment to support the attachment and for ease of insertion into the oven. The door 14 is opened by lifting the handles 15 of the door upward and the rotisserie attachment 40 is then attached to the interior of the oven as shown in FIG. 1 or 7. The door 14 is then closed by moving the handle downward and the particular cooking function desired, for example, rotisserie, is selected on the control panel 26. The heating element lever 28 can be used to move the top heating element 16 to the top position, as shown in FIG. 4, or downward to the rear position, as shown in FIG. 5, depending on the particular cooking operation desired. Once the cooking operation is complete, the user can open the door 14 and remove the rotisserie attachment 40 using the rotisserie remover 80.

Figure 8:
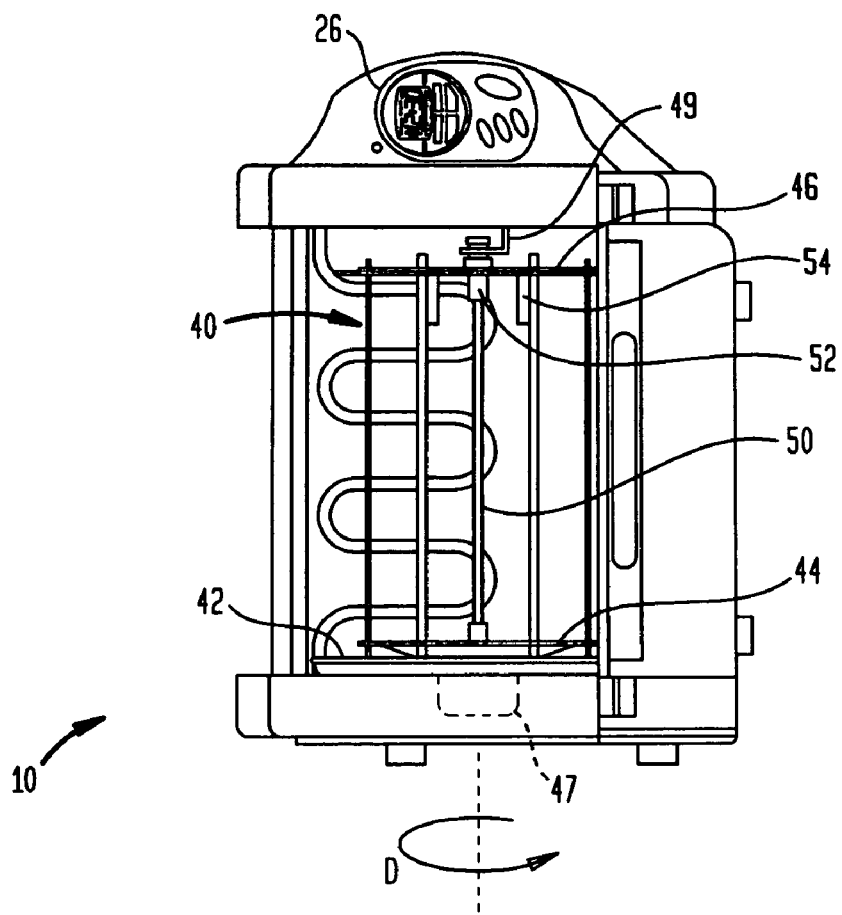
FIG. 8 is a front view of the oven of FIG. 7 in the vertical orientation.
Figure 12:
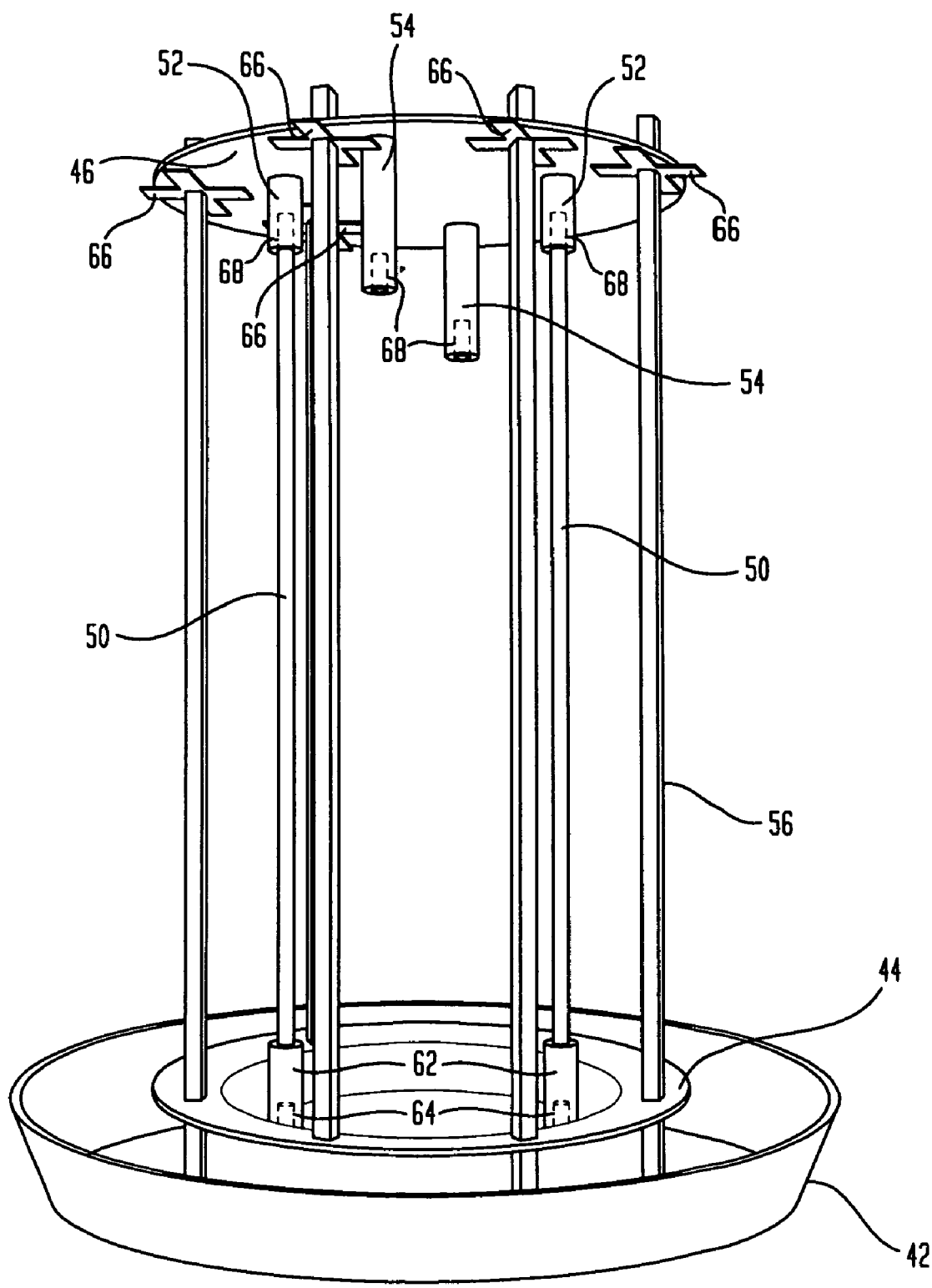
FIG. 12 is a front perspective view of the rotisserie attachment of FIG. 9, situated for use in a vertically oriented oven.

The user can then configure the oven for vertical rotisserie cooking operation as shown in FIG. 8. In this case, the user grips the body 12 of the oven 10, turns it in the counterclockwise direction from the horizontal orientation to the vertical orientation, and then places the left side of the body on a support such as a countertop. The control panel 26 automatically detects the change to the vertical orientation to allow for vertical rotisserie cooking. The control panel 26 is then rotated to the vertical orientation to allow the user to properly view the LCD screen. The rotisserie attachment 40 is then adjusted for vertical rotisserie cooking, as shown in FIG. 12, including adding the drip tray 42 to the bottom portion of the attachment. The desired food items to be cooked are then attached to the rotisserie attachment. The user then opens the door 14, attaches the rotisserie attachment 40 with the food items to the interior of the oven, and closes the door, as shown in FIG. 8. Like in the horizontal rotisserie cooking function, the particular cooking function desired is selected on the control panel 26. Once the cooking operation is complete, the user can open the door 14 and remove the rotisserie attachment 40.

The above described oven may include the various features discussed herein, as well as combinations thereof. For example, the oven can include a sensor to detect the orientation of the oven and to configure the oven in the particular orientation. It is contemplated that the oven can include a heating monitor and an internal fan which may allow for extra heating to be achieved upon realization of a lower than desired temperature and for heat to be dissipated from the unit upon the excess build up of same. The fan may be designed so as to add a convection-type cooking function to the oven.

The oven of the present invention may be constructed from a variety of materials. Preferably, the oven is constructed of plastic suitable to withstand the temperatures reached in and around the oven. Other materials such as various metals and other composites may also be utilized. For example, a partial stainless steel exterior may be desirable to match the motif of a kitchen and the appliances therein. It is preferable that as much of the oven should be made of plastic as possible as it is a benefit of the oven of this invention that it remain lightweight and thus easily positioned and used on a solid surface, such as a counter-top or table. The door has a window portion preferably made of transparent, heat resistant, plastic material, preferably polysulfone, so that the interior of the oven can be viewed during the cooking process without opening the door.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A rotisserie oven comprising:
   an oven body defining an interior and having a door for blocking an opening to the interior, the oven body having a bottom and a first side;
   a first plurality of feet associated with said bottom and a second plurality of feet associated with said first side;
   at least one heating element; and
   a rotisserie attachment disposed in the interior of the oven body for holding food;
   wherein the oven may be utilized while the rotisserie attachment is situated in both horizontal and vertical orientations, the first plurality of feet allowing the oven to sit with said bottom parallel to a work surface in said horizontal orientation and the second plurality of feet allowing the oven to sit with said first side parallel to the work surface in said vertical orientation.

2. The rotisserie oven of claim 1, further comprising a rotatable control panel.

3. The rotisserie oven of claim 2, wherein an LCD screen of the control panel is rotatable.

4. The rotisserie oven of claim 1, further comprising one drip tray for use while the rotisserie attachment is situated in the horizontal orientation and a separate drip tray for use while the rotisserie attachment is situated in the vertical orientation.

5. The rotisserie oven of claim 1, wherein the rotisserie attachment is attachable to the oven body in at least two positions to enable the rotisserie attachment to hold and rotate food for cooking when the rotisserie attachment is orientated in either the horizontal and vertical orientations, the rotisserie attachment being adjustable in length for disposition in either of the at least two positions.

6. The rotisserie oven of claim 5, wherein the rotisserie attachment comprises at least two rods having first and second ends coupled between at least two plates, wherein one of the plates comprises at least two short posts and at least two long posts, and the first ends of the rods are capable of being coupled to both the short and long posts.

7. The rotisserie oven of claim 6, wherein the first ends of the rods are connected to the short posts to permit the rotisserie attachment to rotate when the rotisserie attachment is orientated in the horizontal orientation, and connected to the long posts to permit the rotisserie attachment to rotate when the rotisserie attachment is orientated in the vertical orientation.

8. The rotisserie oven of claim 1, wherein the at least one heating element is rotatable.

9. The rotisserie oven of claim 8, wherein the oven includes two heating elements, one of which is rotatable.

* * * * *